Dec. 30, 1952  E. I. RYDER  2,623,718
CONTROL DEVICE FOR AIRPLANES
Filed Aug. 21, 1950  2 SHEETS—SHEET 1
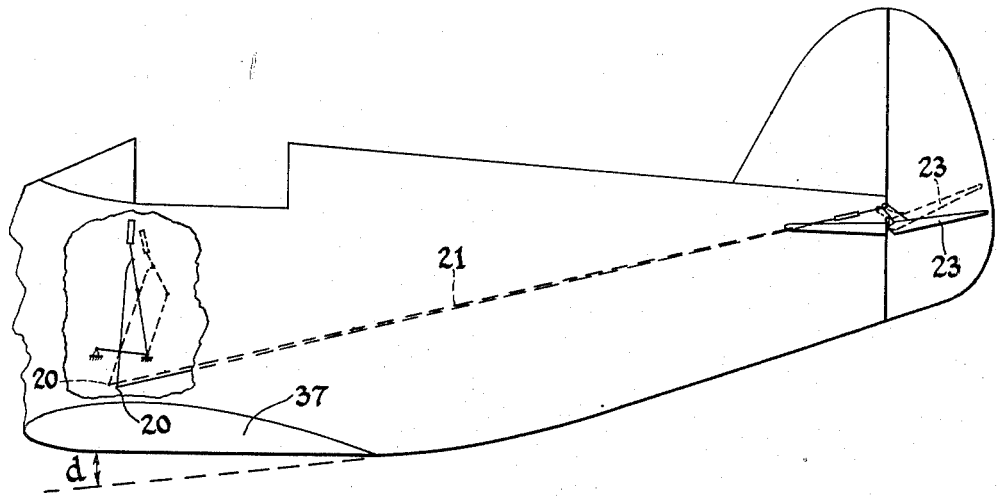
FIG. I
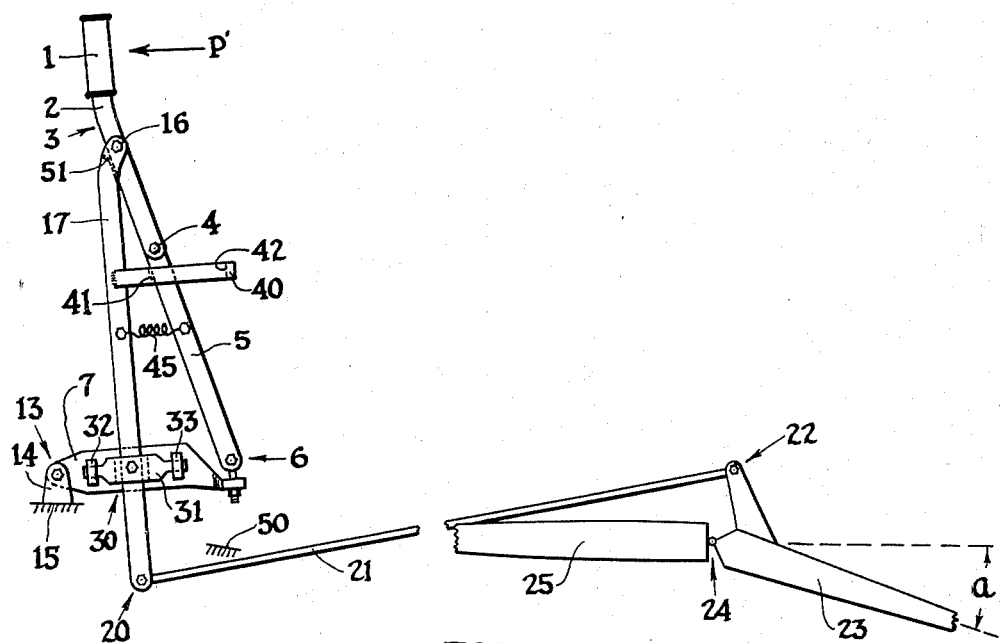
FIG. II
INVENTOR
Edward Irwin Ryder Dec. 30, 1952     E. I. RYDER     2,623,718
CONTROL DEVICE FOR AIRPLANES
Filed Aug. 21, 1950     2 SHEETS—SHEET 2
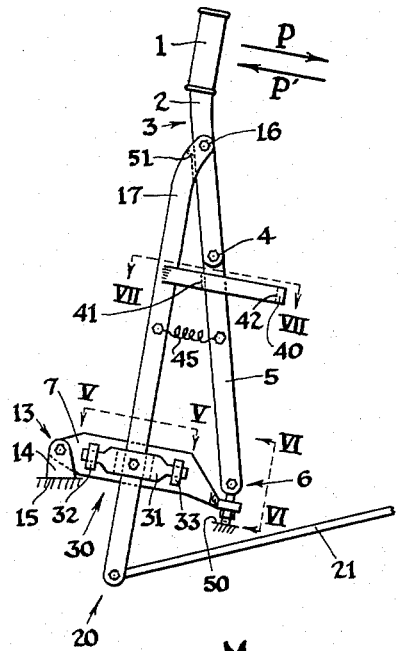
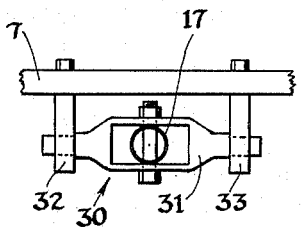
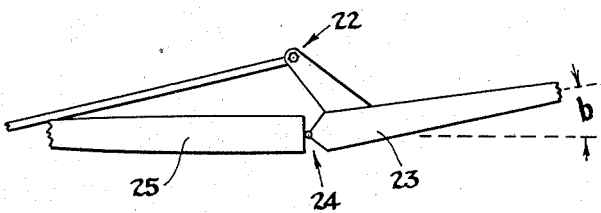
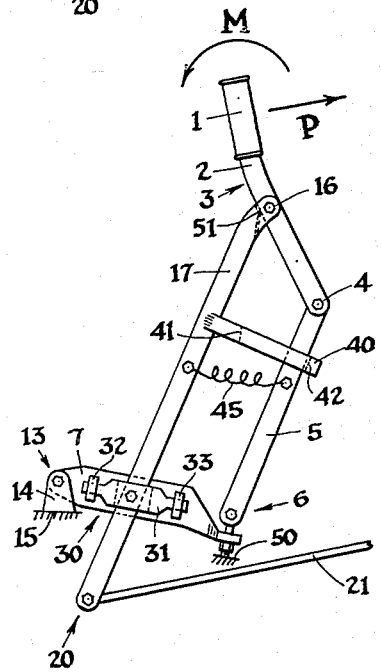
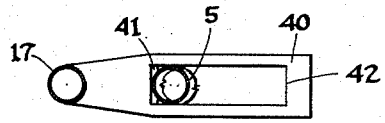
INVENTOR
Edward Irwin Ryder Patented Dec. 30, 1952

2,623,718

UNITED STATES PATENT OFFICE 2,623,718

CONTROL DEVICE FOR AIRPLANES

Edward I. Ryder, Grand Rapids, Mich.

Application August 21, 1950, Serial No. 180,685

3 Claims. (Cl. 244—83)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to improvements in a control for and airplane and more particularly to a device for controlling the elevators of an airplane.

The problem for which my present invention provides a solution arises in various maneuvers of an airplane, and in particular out of the hazards encountered in the maneuver of landing an airplane with controls of the conventional type now in general use. The hazards are inherent in the design and control arrangements of the conventional type.

An airplane is "flying" only when the angle of attack of the wings (angle $d$ of Figure I) is within a rather narrow range. The change of angle of attack from that at which the lift is zero to the stalling angle is only of the order of 20 degrees in most planes. The elevator is the control which is used to select the desired angle of attack in this rather limited and narrow range. Conventional controls allows such freedom of control of the elevator, that the pilot can effect angles of attack well outside this narrow range. If the angle of attack becomes too great, the airplane becomes stalled—a condition which is unnecessary and distinctly undesirable and dangerous for all ordinary flying, although it is of importance in the final stages of the landing maneuver.

A given position of the elevator control (all other factors remaining constant) will result in the airplane's flying at a given angle of attack and at a definite air speed. Consider, for example, the following data typical for a light airplane in power-off flight, and having a power-off staling speed of 40 M. P. H.

Elevator deflection:      Air speed, M. P. H.
    15° up _____ 42
    10° up _____ 45
    0 _____ 55
    5° down _____ 80

It follows that if the elevator control is limited to a certain amount of up-elevator (say 10 degrees in our example) that a power-off air speed above stalling speed may be assured. Hence, it will be impossible to stall the airplane without the aid of power. This eliminates a prevalent cause of crashes today—accidental stalling in landing operations.

It should be pointed out that such limitation of control need not interfere with any normal flight maneuvers, including acrobatics, since at normal flight speeds large deflections of the elevator are never called for. One airplane successfully in use for many years employs this type of limitation on the elevator control.

A pilot will observe, however, that the ability to stall an airplane is a prerequisite to making the conventional "three point" landing at the minimum possible air speed. Accordingly, the prior art has long been confronted with the problem of preventing accidental stalling without preventing intentional stalling.

The control device of this invention solves the problem which has been explained above. The invention comprises a control member which in one movement thereof is operable to actuate the elevators to an intermediate up position, and which, when subjected to an additional and independent moment, is operable to actuate the elevators to an extreme up position. The intermediate up position of the elevators is one for which the corresponding air speed in power-off flight is a reasonable margin above the stalling speed, while the extreme up position will effect a complete stall.

It is, therefore, an object of this invention to provide a single control device which is operable to effect motion of the elevator to one limited up position at which the airplane will not stall, and also to a second, extreme up position at which the airplane will stall.

It is a further object of this invention to provide a control device of such construction that the conditioned reflex action of the pilot under emergency conditions, in which he pulls back on the elevator control, will result in an elevator movement not exceeding a first limited up position, but of such construction that the pilot can, when he desires, cause the elevator to move up to a position beyond the first limited position so as to effect a stall.

Figure I is a diagrammatic view of an airplane having an elevator control device embodying the present invention.

Figures II, III and IV are enlarged side elevational views of the control device and elevator of Figure I and show the device in three positions of adjustment.

In Figure II the elevator 23 is in a depressed position and the control device is in a corresponding position.

In Figure III the elevator 23 is in an intermediate up position, and the control device is in a corresponding position, which is predetermined by engagement of the arm 7 with the stop 50.

In Figure IV the elevator 23 is in the extreme up position, at which the airplane will stall, and the control device is "jackknifed" up the moment M in such manner as to effect that extreme up position.

Figure V is a detail view taken on line V—V of Figure III.

Figure VI is a detail elevational view taken on line VI—VI of Figure III.

Figure VII is a detail horizontal section taken on line VII—VII of Figure III.

The embodiment shown in Figure I, and detailed in Figures II, III and IV, consists, in part, of a control grip 1, a control stick 2, the two together composing a control member 3. It is obvious that the control member 3 might, in the alternative, comprise a conventional airplane control wheel (not shown) mounted on the control stick 2 in the place of the grip 1. The control stick 2 is secured by a pivotal connection 4 to a connecting member 5, adjacent one end thereof. Adjacent the opposite end of connecting member 5, there is a connection 6, flexible in all directions, to a point near one end of an arm or arm member 7.

The connection 6 is detailed in Figure VI. The lower end of connecting member 5 has a slot cut in it, into which fits a self-aligning bearing 8, journaled in eye-bolt 9 which is secured to arm 7. The center of bearing 8 lies on the axis 32—33 (Figure III) extended.

Near the end of the arm 7 opposite the connection 6, there is a pivotal connection 13 securing the arm 7 to a bracket 14 carried by the frame 15 of the airplane. Between its ends, the control stick 2 is secured by a pivotal connection 16 to a point adjacent one end of a lever 17. Adjacent the opposite end of the lever 17, a pivotal connection 20 secures the lever 17 to a link 21 which extends lengthwise of the airplane (see Figure I) to a pivotal connection 22 to a bracket rigidly attached to a conventional elevator 23, thereby operatively connecting said lever to said elevator. The elevator 23 is secured by a hinge joint 24 to a conventional horizontal stabilizer 25.

Between the ends of the arm 7, there is a universal joint 30 (Figures III and V) connecting arm 7 to lever 17 at a place intermediate its ends, and including a universal bearing block 31 and bearings 32 and 33 carried by the arm 7. The lever 17 is pivotally connected to the universal bearing block 31. The ends of the universal bearing block are journaled in the two bearings 32 and 33. A conventional aircraft wing 37 is shown in side elevation in Figure I.

Extending from the lever 17, there is a slotted bar 40 (Figures III and VII) through which the connecting member 5 extends. The two stops 41 and 42 at opposite ends of the slot in the bar 40 (41 close to and 42 away from the lever 17) limit the movement of the connecting member 5 relative to bar 40 and lever 17 as shown in Figures III and IV. A tension spring 45, connected to the members 5 and 17, tends to hold connecting member 5 against stop 41 and adjacent lever 17 (Figures II and III).

The airplane frame is provided with a stop 50 for limiting in one direction the movement of the arm 7 about the pivotal connection 13 as shown in Figures III and IV.

The present invention seeks to modify and improve the controls for elevators. It contemplates, however, a continued conventional control of ailerons, by the connection of aileron control cables (not shown) to the lever 17 in the conventional manner. The members 3, 5 and 17 are free to rotate about the axis of the bearings 32 and 33 to effect aileron control through such connection. If the control member 3 should be fitted with a wheel (not shown) in place of control grip 1, then the aileron cables might be connected to that wheel in the conventional manner, and the connection 6 and the universal joint 30 might be simple pin joints.

*Operation*

In normal operation of the airplane, the control stick 2 and the connecting member 5 will remain aligned and in the position fixed by stop 41 as shown in Figures II and III. Manual operation of the control grip 1, will effect movement of the members 2, 5, 7 and 17 as a unit assembly, about a pivot point at connection 13, into the positions shown in Figures II and III and any intermediate position, thereby effecting movement of the elevator in the conventional manner to any angle desired for normal flight. Ailerons (through connections not shown) may be operated in the conventional manner by swinging the control device about the axis of the bearings 32 and 33.

In Figure II, the position of the device to effect a down-elevator angle $a$ is shown. If the pilot exerts a pull P on control grip 1, he may move the device toward and into the position shown in Figure III with the arm 7 arrested by the stop 50. Such movement will effect an up-elevator angle $b$ (Figure III), which is the position for which the corresponding air speed in power-off flight is a reasonable margin above the stalling speed. The spring 45 has sufficient tension to hold the connecting member 5 against stop 41 (Figure III) and to withstand any normal push P' calculated to move the elevator downward.

When it is desired to stall the airplane, the pilot may, by applying a pull P so as to bring the control device into the position shown in Figure III, and by applying in conjunction with the pull P, a moment M, cause the device to "jackknife" into the position shown in Figure IV. The members 2, 5, 7 and 17, each articulating two other of said members, are rearranged with the consequent additional movement of the connection 20 (see Figure I) and the resulting movement of the elevator 23 to the angle $c$ shown in Figure IV which is ample to stall the airplane.

It is to be observed that the conditioned reflexes of the pilot in which he pulls back on the stick hard when he breaks out of an overcast or seeks to pull up over a previously unseen guy wire while gliding toward a landing, will result in an elevator movement not exceeding the intermediate limited position (see Figure III), thus preventing an accidental stall. But with the application of a different type of force, namely, the moment M, in conjunction with the pull P, the stall may be effected whenever it is desired and without operation of any controls other than the control member 3.

It is obvious that the construction of the connections between members in this invention may vary. Or the link 21 might be connected to the device at a different place. The member 40 might be a solid bar carrying lugs to serve as stops. The limitation of motion effected by stops 41 and 42 might be effected by stops attached to any one of members 2, 5, 7 and 17 and cooperating with any other of the members, or by the interaction of the base 51 of the fork in lever 17 at joint 16 with the member 2. Other changes might be made in the details of the device without departure from the scope of the present invention.

It is intended, therefore, that all matter contained in the above description shall be interpreted as illustrative, and not in any limited sense.

What is claimed is:

1. An improved control device for adjusting an airplane elevator into extreme and intermediate limited positions, said device comprising a control member, a lever, a link connecting said lever to said elevator, a connecting member, an arm member, said control member being secured by a first pivotal connection to said lever and by a second pivotal connection to said connecting member, said lever and said connecting member being each separately pivotally connected to said arm member, said arm member being pivotally mounted on an airplane, means limiting the pivotal movement of said members relative to each other between two predetermined extreme positions, and yielding means normally retaining said members in one of said extreme positions.

2. A safety attachment for operative coupling to a conventional elevator control member of an aircraft equipped with a conventional elevator, a conventional horizontal stabilizer and having a conventional frame structure the improvement which includes a quadrilateral element comprising a control stick, a connecting member pivotally connected with one end of said stick, an arm member flexibly connected with said connecting member, a universal joint mounted on said arm member intermediate of its ends and a lever provided with a forked end which is pivotally coupled with said control stick intermediate of its ends, said forked end formed into a base which limits the relative motion of said lever and said stick, said lever being coupled to said arm member by said universal joint and having an extension to which a link is coupled for operating a conventional elevator control, a slotted bar fastened to said lever intermediate its ends having terminal stops, said slotted bar straddling said connecting member intermediate of its ends, a supporting bracket on which said arm member is pivotally mounted, a tension spring coupling said connecting member with said lever intermediate their ends and a limiting stop on said frame structure for the free end of said arm member.

3. A safety attachment for aircraft provided with a conventional elevator, a conventional horizontal stabilizer, and a conventional frame structure, the improvement which includes a quadrilateral element comprising a control stick, a connecting member pivotally connected with an end of said control stick, an arm member flexibly connected with said connecting member, a lever pivotally connected with said control stick, a universal joint connecting said arm member with said lever intermediate the ends of said lever, a stop for restricting the movement of said connecting member toward said lever, a second stop for restricting the movement of said connecting member away from said lever, and a spring for returning the elements of said attachment to an initial position.

EDWARD I. RYDER.

REFERENCES CITED

The following references are of record in the file of this patent:

UNITED STATES PATENTS

| Number | Name | Date |
|---|---|---|
| 2,441,211 | Schenk | May 11, 1948 |
| 2,511,446 | Scheer | June 13, 1950 |